United States Patent [19]
Antonson et al.

[11] 3,737,212
[45] June 5, 1973

[54] DIFFRACTION OPTICS HEAD UP DISPLAY

[75] Inventors: Arvid L. Antonson, Vestal; John E. Bigelow; Charles R. Stein, both of Schenectady; James W. Van Horn, Vestal, all of N.Y.

[73] Assignee: General Electric Company, New York, N.Y.

[22] Filed: Dec. 14, 1970

[21] Appl. No.: 97,891

[52] U.S. Cl..............350/174, 350/3.5, 350/162 ZP
[51] Int. Cl...............................................G02b 27/14
[58] Field of Search....................350/125, 169, 174, 350/294, 301, 3.5, 162 ZP; 35/12 N, 10.2, 25; 343/6; 178/7.85, 7.88, 7.89; 356/251, 252; 353/12, 13, 30

[56] References Cited
UNITED STATES PATENTS

| | | | |
|---|---|---|---|
| 3,633,988 | 1/1972 | Farrar | 350/3.5 |
| 3,499,703 | 3/1970 | Bitetto | 350/162 |
| 3,446,916 | 5/1969 | Abel et al. | 356/251 |
| 2,953,961 | 9/1960 | Court | 350/211 |
| 3,435,452 | 3/1969 | Kilpatrick | 350/3.5 |
| 3,522,980 | 8/1970 | Lones | 350/172 |

FOREIGN PATENTS OR APPLICATIONS 477,814  1/1938  Great Britain.....................178/7.88

*Primary Examiner*—Ronald L. Wibert
*Assistant Examiner*—Michael J. Tokar
*Attorney*—Francis K. Richwine, Irving M. Freedman, Joseph B. Forman, Fran L. Neuhauser and Oscar B. Waddell

[57] ABSTRACT

A head up display for combining a direct view as for example that of an aircraft pilot with superimposed light from another source by use of diffraction optics as a combining and collimating element. A specific implementation of an optical combining element and a secondary projector is also disclosed.

15 Claims, 3 Drawing Figures

PATENTED JUN 5 1973  3,737,212

INVENTORS:
ARVID L. ANTONSON,
JOHN E. BIGELOW,
CHARLES R. STEIN,
JAMES W. VAN HORN,

BY Francis K. Richmine
THEIR ATTORNEY.

DIFFRACTION OPTICS HEAD UP DISPLAY

BACKGROUND OF INVENTION

1. Field of Invention

Sophistication in aircraft systems has required development of improved means to provide information to pilots under conditions that do not distract the pilot from viewing visible air space and landscape. Such information is best presented and most easily assimilated as visual information within the normal field of vision. The Heads-up-Display or HUD has as one solution to this problem become a separate field of invention. One implementation of the HUD is by the positioning of a sheet of relatively transparent glass in the pilot's normal field of view and at an angle so that light projected against a surface of the glass is reflected to the pilot. The term "combining glass" is derived from the fact of the combination of plural optical images. The projected light can reproduce any of several images including for example instrumentation, symbology, view augmentation or view synthesization, generated by any of several means such as light source or by raster scan or calligraphy in cathode ray tubes. Among other uses HUD facilitates provision of an aiming point, sometimes in the form of an illuminated circular reticle, in armed military aircraft.

2. Description of Prior Art

Heads-up-Displays developed from flat reflective combining glasses to shaped combining glasses in combination with specialized projectors and the use of intermediate optical elements to improve optical results by elimination of parallax and other deficiencies. Specific problems are recognized in the provision of an aiming device which must appear to the pilot to be at target range and must be movable to permit incorporation of weapon adjustment for type of weapon, gravity, and relative velocities of moving targets. Collimation of light to generate a virtual image at a distance has generally been accomplished by passing light through lenses prior to its reflection from the combining glass. Accurate movement of an aiming point to define a proper line of sight has been approached in several ways including movable light sources, projection optics and specially shaped combining glasses.

SUMMARY OF INVENTION

The present invention in its generic form contemplates the use of a diffracting optical element in a combining glass to make use of diffraction phenomena to combine light with or without concurrent collimation. This also removes the necessity for and makes optional certain additional optical elements often used as for example collimation or other focusing of light transmitting an aiming point image prior to its reaching a combining glass. This invention, among other things, permits projection of the secondary image from the rear of the combining element for better space utilization, permits simpler designs and permits simultaneous transmission of both aiming point and view augmentation information. In addition to the broad concept, the invention contemplates specific utilizations of curved diffracting optical components containing systematically placed deviations in optical properties, such as transparency, which deviations may be holographic recordings of either a point or an image in combination with a light source that may be a point or an illuminated image. A cathode ray tube (CRT) may be used as a light source. Still more specifically the invention contemplates, for certain applications, utilization of a spherically curved diffracting optical component having its convex surface placed toward the viewer and receiving projected light on its concave side from a CRT having a concave parabolic face.

DESCRIPTION OF PREFERRED EMBODIMENT

Figure 1:
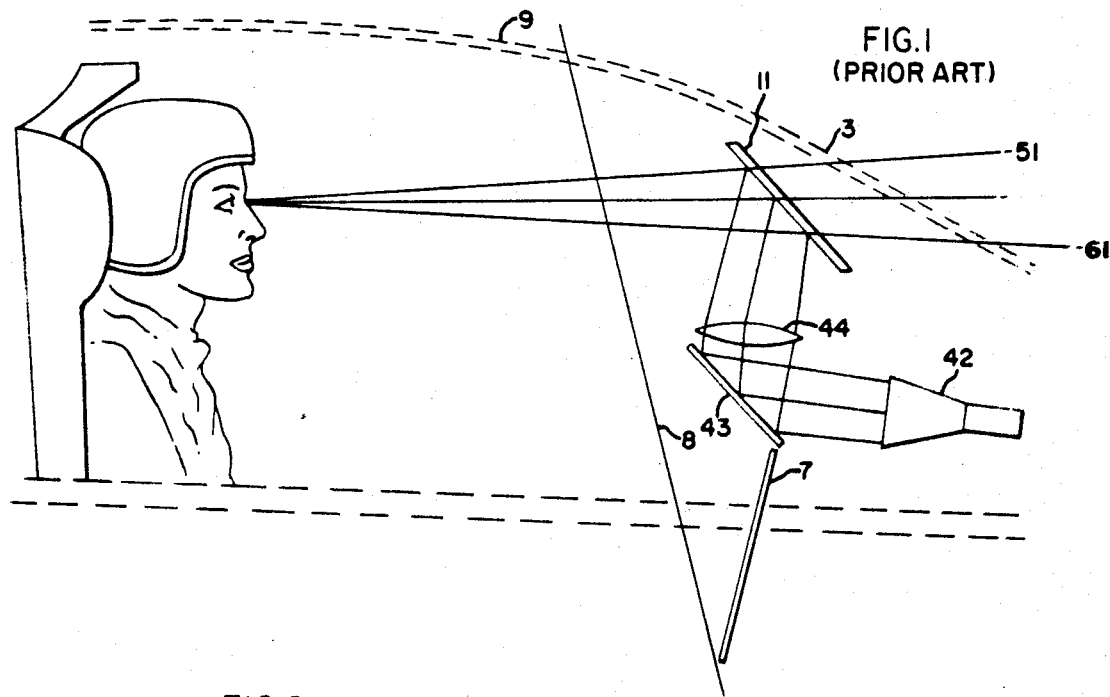
FIG. 1 is a graphic representation of the organization of a heads up display in an aircraft cockpit and the components of such display in a form representing the prior art.
Figure 2:
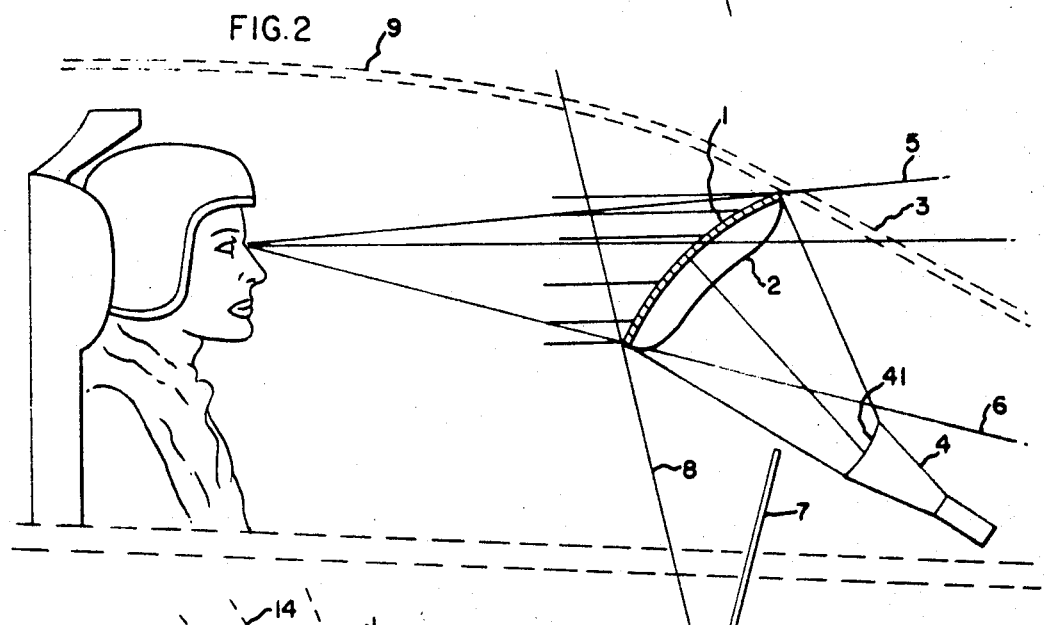
FIG. 2 is a similar representation of a Heads-up-Display according to one embodiment of the present invention.

FIG. 2 illustrates the application of this invention to a combining glass in an aircraft cockpit by use of a diffracting optical component which for the purpose of explanation will be referred to as a "diffraction lens". The "diffraction lens" 1 as shown in vertical section is the curved implementation as indicated by the visibility of the far edge 2 of the lens. The light providing the image to be superimposed on the pilot's field of vision through the windshield 3 is provided by cathode ray tube 4. Normal "straight ahead" field of vision of the pilot through the windshield is indicated by lines 5 and 6. The numeral 7 represents the instrument panel which constitutes one of the major obstructions in the placement of a HUD system and line 8 represents a clearance line for pilot ejection, in which case of course canopy 9 would be removed. Although the invention is illustrated in FIG. 2 in a highly developed specific embodiment wherein the "diffraction lens" 1 is a convex spherical segment and the face 41 of the cooperating CRT is concave and parabolic, a flat "lens" cooperating with an incandescent symbol projector is within the concept. This arrangement in which the light providing the image to be superimposed is projected onto the side of the lens remote from the pilot facilitates cockpit arrangement as easily contrasted with the more conventional layout illustrated in FIG. 1. In FIG. 1 a conventional combining glass 11 is inserted at an angle to the pilot's "straight ahead" field of view as indicated by lines 51 and 61 and receives light from a source as for example cathode ray tube 42 on the pilot's side of the combining glass where it is projected by optical elements represented by mirror 43 and lens 44. Some of the optical elements in this case are necessitated for folding the projection equipment into the space between instrument panel 7 and ejection line 8 on one hand and the windshield 3. Comparison of FIGS. 1 and 2 provides an appreciation of one of the primary benefits of this invention which is the assistance of cockpit layout. Less easily appreciated advantages of the invention include the optical results and quality.

Figure 3:
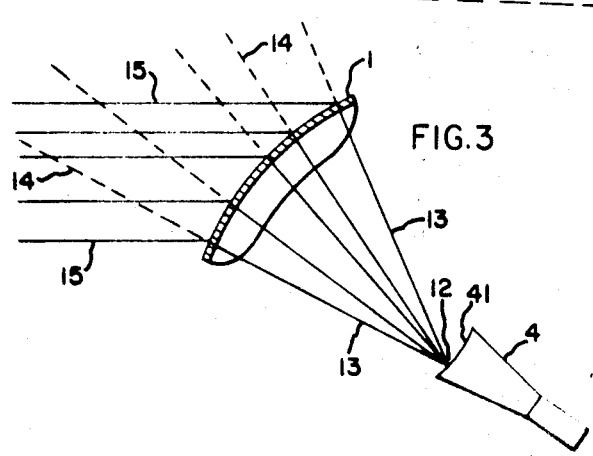
FIG. 3 is a graphic representation of the principles of diffraction and collimation utilized in this invention.

FIG. 3 is a graphic representation to facilitate explanation of the optical properties incorporated into the "diffraction lens" 1 illustrated in FIG. 2. The projection lines radiating from a point source as from a point on the face of the CRT are converted through action with the "lens" into parallel lines indicating collimated light in the first order direction 15 as diffracted from the $0^{th}$ order direction 14. These two phenomena are attributes of an optical element having systematically placed deviations in optical properties such as opaque lines or alternating bands in the nature of a zone plate when those deviations are selected to accomplish that result. The diffraction causes a bending of the light to measurable angles from the original as indicated by ray lines. In the instant application the first order (i.e. that closest to the direct transmittal which is 0° order) interference pattern is used although any order other than 0° may be used and the optical qualities of the materials used selected to discourage higher orders — or any undesired orders — of diffraction. The systematically placed deviations in optical properties in a transparent medium, which can be internal variations of transparency, variations in optical thickness or be darkened or blackened lines applied to the exterior of the transparent material, if in specialized curved form with dimensionally related distances between deviations can cause diffraction and can act as a lens to provide collimation or other focusing. (The term "systematically placed deviations in optical properties in a transparent medium" and similar descriptive phrases or terms are used since there is no recognized name for this class of optical elements producing usable diffraction patterns which elements include of course special cases which are named such as diffraction gratings, zone plates, etc.) The preferred deviation is of the pattern produced holographically by the projection of a point source but a holographic projection of an image such as a reticle, although more complicated, might be preferred for some applications. The best way to make the kind of optical element desired for this use is by holography; specifically by holographic recording on photosensitive material of light projected from the selected point or image shaped source. This has the side effect of compensating for dimensional inaccuracies in curved plates such as the one used, which inaccuracies could cause aberrations.

Utilization of a diffraction optics for this purpose is enhanced practically as a result of the development of rare earth doped phosphors for cathode ray tubes. These materials permit high energies in narrow wavelength bands and therefore can be used to produce the intense monochromatic light sources facilitating diffraction. Since one of the primary objectives of this invention is to superimpose information of the nature of a reticle, circular or of other shape, or symbology in the nature of lines or figures representing attitude, altitude or other flight parameters on a natural view, the monochromatic property of such light is also an aid to pilot recognition. Shaping of the "diffraction lens" 1 and of the face 41 of the CRT is appropriate to avoid parallax that could result from the somewhat different orientations and locations of the source of the light as it is broadened or moved across the face of the CRT. One specific solution to a specific application of the invention derived from experimentation based on calculations resulted in a spherical "diffraction lens" and a concave paraboloidal CRT face wherein the "diffraction lens" was of the relationship of $X^2 + Y^2 = 4$ and the CRT face had a curvature of $Y = 0.05485\ X^2$ with the proper separation of the two elements for cooperation. Although experimentation showed that this produced a useful accuracy and produced optical results on the order of 10 times that of some other configurations used in experimentation, other good implementations should be found within these concepts.

This invention has peculiar applicability to aircraft weapons systems and navigation or flight control aids in that an illuminated reticle or other visual aid projected as by a CRT can be moved about by means of electronic drives in the CRT to assume the proper position dependent on parameters of the weapons system or aircraft such as trajectories, range, velocities, attitude, altitude and relative movements of weapon and target so that the pilot may aim the weapon by flying the aircraft so as to maintain the reticle on the target or an auxiliary aiming point or so that the pilot is assisted in other ways, e.g. to maintain a desired glide path on landing. In addition to these applications, the CRT projection onto the "diffraction lens" without intervening optics facilitates the projection of view augmentation information, either real or scene generation, without the accuracy problems that could result from optical elements which might be used to collimate light from a reticle. With this system it is possible to add any of several different types of view augmentation light including ordinary TV, narrow band TV such as IR, low light level TV or, with the necessary supporting electronic equipment, radar sensed information or computed displays.

The foregoing description is based primarily on the use of substantially monochromatic light sources for reticles, symbology and even view augmentation. Use of monochromatic light simplifies implementation but is not a limitation on the system except for accuracy in the use of collimated reticles when allowing for some movement by the viewer. Information other than collimated, position significant, reticles can be displayed in multicolor form with, of course, each color having a slightly different angle of diffraction causing images to lie in slightly different planes.

It is also possible to add certain optical elements to correct for remaining optical aberrations including color aberrations without detracting from the beneficial results of the invention. This latter, i.e. removal of color aberrations, would appear to make multicolor applications of the invention possible with related colored images in addition to the separately colored images.

We claim:

1. A combining glass for head up display equipment comprising an optical element having light diffracting properties in the form of systematically place deviations in optical properties which cause light diffraction for projecting the image of a separately presented object on one side of the glass at a position on the other side of the glass, said combining glass being substantially spherical in shape to correct optical aberrations due to different orientations and locations of projected light with spherical surface having curvature defined by $X^2 + Y^2 = 4$.

2. In head up display equipment having a first optical element interposed between a viewer and his real world view and a second optical component including means on one side of said first optical component for projecting light directly onto said first optical element whereby said light and said first optical element cooperate to create for the viewer a secondary image superimposed on said real world view, the improvement comprising use of a diffracting optical element as said first optical element for projecting a secondary image on the other side of said first optical element.

3. The combining glass of claim 1 wherein said element is also a collimator.

4. The improved heads up display equipment of claim 2 wherein said diffracting optical element used as said first optical element is a diffraction lens.

5. The combining glass of claim 1 wherein said element constitutes a zone plate.

6. The combining glass of claim 1 wherein said systematically placed deviations constitute a holographic recording of a light source and the projection of light therethrough from a source on one side of said glass collimates said light in the form of said source to focus the image of said source at a near distance on the other side of said glass.

7. The improved equipment of claim 4 wherein said means for projecting light includes means for emitting controlled frequency light of single or multiple frequencies.

8. The improved equipment of claim 2 wherein said first optical element is substantially transparent to the real world view but contains systematically placed deviations in optical properties so as to cause diffraction phenomena in the light projected from said means for projecting and to cause one order of diffraction of said light to create said secondary image in superimposition on said real world view.

9. The equipment of claim 8 wherein said deviations are in the form of a holographic recording of a light source.

10. The equipment of claim 8 wherein said first optical element is curved to correct optical aberrations due to different orientations and locations of the said projected light and said second component includes a cathode ray tube having a curved face.

11. The equipment of claim 10 wherein the concave sides of said combining glass and said curved face are mutually facing.

12. The equipment of claim 11 wherein said combining glass is substantially spherical and said face is substantially paraboloidal.

13. The equipment of claim 12 wherein said curvatures of said combining glass and said face are related as approximately $X^2 + Y^2 = 4$ and $Y = 0.05485\ X^2$.

14. The equipment of claim 9 wherein said light source, of which said deviations are a holographic recording, is a point source.

15. The equipment of claim 9 wherein said light source, of which said deviations are a holographic recording, is of the shape of an object whereby a shaped secondary image may be created by projection of a point source by said means for projecting.

* * * * *